(12) United States Patent
Mourik et al.

(10) Patent No.: US 7,801,268 B1
(45) Date of Patent: *Sep. 21, 2010

(54) NONDESTRUCTIVE METHOD OF MEASURING A REGION WITHIN AN ULTRA-HARD POLYCRYSTALLINE CONSTRUCTION

(75) Inventors: Nephi Mourik, Provo, UT (US); Ronald K. Eyre, Orem, UT (US)

(73) Assignee: Smith International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/498,239

(22) Filed: Jul. 6, 2009

Related U.S. Application Data (63) Continuation of application No. 11/745,975, filed on May 8, 2007, now Pat. No. 7,558,369.

(51) Int. Cl.
*G01B 15/02* (2006.01)
(52) U.S. Cl. .......................... 378/54; 378/62
(58) Field of Classification Search ............ 378/4, 378/51, 53–58, 62, 64, 89
See application file for complete search history.

(56) References Cited

U.S. PATENT DOCUMENTS

| | | | |
|---|---|---|---|
| 5,603,414 A | 2/1997 | Rooney et al. | |
| 5,645,617 A * | 7/1997 | Frushour | 51/309 |
| 5,835,205 A | 11/1998 | Hunter et al. | |
| 6,544,308 B2 | 4/2003 | Griffin et al. | |
| 7,196,782 B2 | 3/2007 | Fielden et al. | |

* cited by examiner

*Primary Examiner*—Jurie Yun
(74) *Attorney, Agent, or Firm*—Connolly Bove Lodge & Hutz LLP (57) ABSTRACT

Methods for nondestructively measuring a characteristic within an ultra-hard polycrystalline construction comprises projecting a beam of energy from an emitter onto the construction. The energy is directed to a target region within the ultra-hard polycrystalline construction and passes through the construction where it is received by a detector. The target region can be within a diamond body of the construction, and can relate to an interface between two or more regions within the diamond body. The energy that is received by the detector is evaluated for the purpose of determining the desired measurement characteristic. In an example embodiment, the measured characteristic can be the interface of between two or more regions and the distance from a surface of the construction to the interface. The method can be used to generate an average distance within the construction, and to provide a visual image of the same in a nondestructive manner.

20 Claims, 6 Drawing Sheets

NONDESTRUCTIVE METHOD OF MEASURING A REGION WITHIN AN ULTRA-HARD POLYCRYSTALLINE CONSTRUCTION

CROSS-REFERENCE TO RELATED APPLICATIONS

This application is a continuation of U.S. application Ser. No. 11/745,975 filed May 8, 2007, now U.S. Pat. No. 7,558, 369, which claims benefit of U.S. Application No. 60/799,141 filed May 9, 2006, both of which are incorporated herein in their entirety.

FIELD OF THE INVENTION

This invention relates to nondestructive methods developed for measuring the characteristics of one or more region within a material microstructure and, more specifically, to a nondestructive device and method of using the same for measuring the thickness or variation in thickness of one or more regions in ultra-hard polycrystalline constructions.

BACKGROUND OF THE INVENTION

The formation of constructions having a material microstructure made up or two or more different layers, regions, and/or phases of materials is well known. Such constructions are intentionally engineered in this fashion to provide a desired mix of physical, mechanical and/or thermal properties within the material microstructure, making it better equipped to handle a particular end use application. In order to provide such desired properties in a predictable and consistent manner, it is desired that the characteristics, e.g., the thickness, volume or area, of such layers, regions and/or phases within the microstructure be controlled for consistency.

It is, therefore, necessary that the desired characteristics of such layers, regions, and/or phases of materials within the construction be measured for the purpose of both controlling the process that is used to make the construction to thereby ensure its consistency, and for controlling the quality or ability of the construction to perform as expected. Methods useful for measuring the thickness or variation in the thickness of a region, layer or phase within a material construction will vary depending on the nature of the construction. For material constructions used in tooling, wear, and/or cutting applications provided in the form of an ultra-hard polycrystalline material, e.g., comprising polycrystalline diamond, a useful method for measuring the thickness or determining the variation of thickness of one or more regions within the construction is by destructive method or destructive testing.

Destructive testing requires that the construction itself be cut or otherwise treated in a manner that physically exposes the targeted regions to be measured or evaluated by visual inspection. In an example embodiment, where the construction is one comprising an ultra-hard polycrystalline material such as diamond or cubic boron nitride, the construction itself is cut, e.g., in half, so that the different layers, regions and/or phases forming the construction can be viewed visually for purposes of measuring the thickness or variation of thickness of the regions. In an example embodiment, such visual indication is made with the assistance of a magnifying device such as a microscope, e.g., a scanning electron microscope.

While such destructive test method is useful for determining the thickness or variation of thickness within a construction, it is time-consuming in that after the part is cut, it must usually be further prepared by grinding, polishing or the like, then mounted for microscopic evaluation. Further, such microscopic evaluation is oftentimes taken along a number of different points to gather sufficient measurement data to arrive at a numerical value that is representative of the measurement data for the entire part, e.g., an average region thickness throughout the part. Still further, the use of such destructive test method is expensive in that it requires that the part being evaluated be destroyed, thereby adversely impacting the economics associated with manufacturing the parts.

It is, therefore, desired that a method be developed that is capable of measuring a desired characteristic of a material construction, e.g., the thickness or variation of thickness of one or more region, volume, and/or phase within a material construction such as an ultra-hard polycrystalline construction, in a manner that is not destructive. It is further desired that such a method be capable of providing such desired measurement information in a manner that has a known degree of accuracy. It is further desired that the method be capable of providing an indication of the desired characteristic that is representative of the entire construction or part being measured. It is still further desired that the method be capable of providing such measurement information in a manner that is efficient to permit testing on a large-scale production basis.

SUMMARY OF THE INVENTION

Methods and systems provided according to principles of this invention for nondestructively measuring a characteristic within an ultra-hard polycrystalline construction comprise, in an example embodiment, projecting a beam of energy onto the ultra-hard polycrystalline construction. In a preferred embodiment, the beam of energy is provided from an emitter that is constructed to emit energy within the X-ray spectrum of radiation. In such a preferred embodiment, the emitter and the ultra-hard construction are oriented relative to one another such that the beam of energy is directed perpendicular to a surface of the construction calculated to provide the measurement information for a target region of the construction.

The beam of energy is directed to a target region within the ultra-hard polycrystalline construction and passes through the construction where it is received by a detector. In an example embodiment, the detector is positioned downstream from the construction and opposite from the emitter. Generally speaking, the energy that is received by the detector is evaluated for the purpose of determining the desired measurement characteristic.

In an example embodiment, the ultra-hard polycrystalline construction comprises a polycrystalline diamond body, and the measured characteristic relates to a target region that is within the polycrystalline diamond body. The target region can be the location of an interface between two or more regions within the diamond body or the construction. In a particular embodiment, the diamond body comprises a first region that has less catalyst material than a second region, and the measurement characteristic is an interface between the first and second regions. In an example embodiment, the first region can extend a depth from a surface of the construction and such depth can be measured as the distance from the surface to the interface. In an example embodiment, an average depth or distance from the surface to the interface within the construction can be measured and, if desired an image of the interface, i.e., the measured characteristic, can be produced.

A feature of this invention is the ability to obtain measurement information regarding a characteristic of an ultra-hard polycrystalline construction in a nondestructive manner that is accurate, and that can provide average measurement information for the desired characteristic within the entire construction. Further, the method of this invention can be implemented on a large scale to provide such measurement information for a plurality of such constructions in a manner that is relatively time efficient.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION OF THE INVENTION

A nondestructive method useful for determining a desired characteristic, e.g., the thickness of a region, layer, and/or phase, of an ultra-hard polycrystalline construction, according to the principles of this invention, is one using principles of X-ray radioscopy (XRR). As better described below, XRR is used in an example embodiment to provide thickness information and/or variation of thickness information, of a targeted region within an ultra-hard polycrystalline construction in a manner that is accurate and that does not result in the destruction of the part.

In an example embodiment, XRR can be used to measure a desired characteristic of a material construction of a selected part, or can be used to measure a desired characteristic in each of a large number of parts. In an example embodiment, XRR is used to facilitate the rapid measurement of many parts, and thus suitable for measuring a large number of parts in production to provide an indication whether a target characteristic, e.g., region thickness, for each measured part, meets a desired target or set point.

Figure 1:
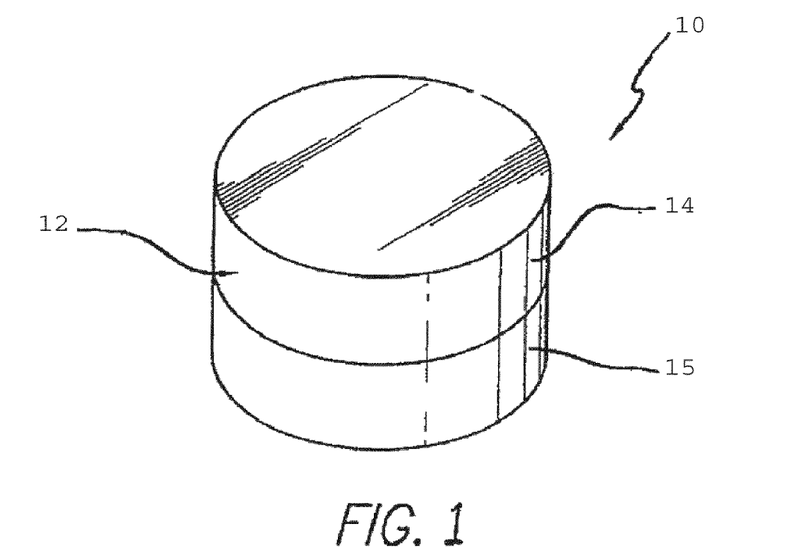
FIG. 1 is schematic view of an ultra-hard polycrystalline construction provided in the form of a compact.

FIG. 1 illustrates an ultra-hard polycrystalline construction 10. The construction generally comprises a body 12 formed from an ultra-hard polycrystalline material 14, e.g., comprising diamond, polycrystalline diamond (PCD), cubic boron nitride (cBN), polycrystalline cubic boron nitride (PcBN), and mixtures thereof. The body 12 may or may not be attached to a substrate. In the example embodiment illustrated in FIG. 1, the construction includes a substrate 15 that is joined together with the body 12 to form a compact.

The substrate 15 can be formed from a variety of different materials such as those useful for forming conventional PCD compacts, like ceramic materials, metallic materials, cermet materials, carbides, nitrides, and mixtures thereof. When the ultra-hard polycrystalline construction comprises polycrystalline diamond, a preferred substrate material comprises cemented tungsten carbide (WC—Co).

Figure 2:
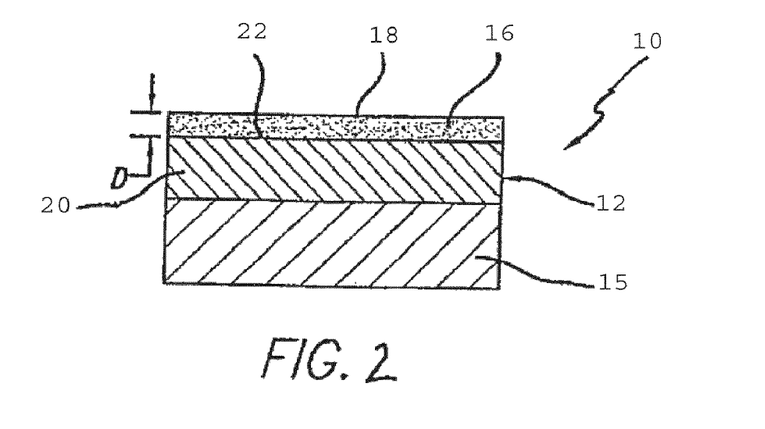
FIG. 2 is a cross-sectional side view of the ultra-hard polycrystalline construction taken along a section of FIG. 1.

FIG. 2 illustrates a cross-sectional view of a section taken through the ultra-hard polycrystalline construction 10 of FIG. 1, illustrating the material microstructure of the construction and its different regions. In an example embodiment, the body 12 includes a first region 16, that extends a depth "D" into the body from an outside body surface 18, and a second region 20, that extends from the first region 16 to the substrate 15. An interface 22 within the body defines the point of transition between the first and second regions 16 and 20.

While a particular polycrystalline construction 10 has been illustrated in FIG. 2, having first and second regions occupying particular locations of the construction, it is to be understood that constructions having regions that are positioned differently relative to one another and/or that are positioned differently relative to the geometry of the construction than that illustrated in FIG. 2 can also be measured using the methods of this invention. For example, the nondestructive measuring technique of this invention can be used for measuring one or more regions, layers and/or phases in an ultra-hard polycrystalline construction positioned at locations other than on the construction front side surface or table, e.g., that can be positioned along a sidewall surface of the construction.

In an example embodiment, the body 12 is formed from PCD and the first region 16 includes PCD that has been treated so that it is substantially free of a catalyst material, e.g., a solvent metal catalyst, used to form the PCD. As used herein, the term "substantially free" is understood to mean that the catalyst material is removed from the first region, in which case the first region has a material microstructure comprising a polycrystalline diamond matrix phase and a plurality of voids interposed therebetween. The term "substantially free" is also understood to include treatments that render the catalyst material used to form the PCD no longer catalytic, such as by reacting the catalyst material to form a noncatalytic compound and/or by encapsulating the catalyst material with another material that prevents the catalyst material from functioning as a catalyst with the polycrystalline diamond matrix phase when the construction is subjected to a cutting, tooling or wear application.

The catalyst material used to form the diamond phase in the construction microstructure can be the same as that used to form conventional PCD by high pressure/high temperature (HPHT) sintering process. Such catalyst materials include metals from Group VIII of the Periodic table, with cobalt (Co) being the most common. In an example embodiment, the catalyst material is a solvent metal catalyst such as Ni, Co, Fe, and combinations thereof. The catalyst material can be removed by chemical, electrical, or electrochemical processes. In an example embodiment, the catalyst material is Co and is removed from the first region by an acid leaching process.

In an example embodiment, it is desired that the depth "D" of the first region within the body be controlled to provide consistent and repeatable characteristics of mechanical and thermal performance for the construction. As explained in greater detail below, it is therefore necessary to develop an accurate and repeatable technique for measuring the depth of the first region in the construction to ensure the consistency of such desired performance characteristics.

In an example construction, the body second region 20 comprises PCD that includes the catalyst material. The second or PCD region 20 has a material microstructure comprising a polycrystalline diamond matrix and the catalyst material disposed interstitially within the matrix. In an example embodiment, the substrate 15 is attached to the body 12 at the interface with the body second region 20.

The depth of the first region can be controlled by adjusting one or more parameters of the process that are used to treat the first region to render it substantially free of the catalyst material. Once a desired depth is achieved, e.g., to meet the desired performance characteristics for a particular end use application, the process is carefully controlled so that the first region depth in all remaining parts within a family of parts (made from the same material and processed in the same manner) is the same. As noted above, a current method that is used for measuring the depth of the body first region is by destructive testing, whereby the part is cut in half, polished or otherwise prepared, and then is viewed and measured using a scanning electron microscope.

As noted above, while this technique enables one to determine the depth of a target region, e.g., the first region, with some degree of accuracy, it also results in the destruction of the part, which adversely impacts manufacturing costs and efficiency. Additionally, this process is time consuming as the user typically measures the depth of the first region along the entire part diameter, and then takes the average of the measured points to arrive at the overall part average thickness of the first region.

While the use of such destructive testing method is effective for determining the average depth of the first region 16 in the body of the destroyed part, using such method on a regular basis is not practical for a large scale manufacturing processes due to both the large number of parts destroyed, and the time involved with preparing and measuring each such part. Ideally, it is desired that a measurement technique or method be adopted that permits the measurement of as many parts produced within a family as possible for the purpose of ensuring the performance characteristics of such part.

Additionally, the use of such destructive testing technique enables one to view the region depth at along one section within the part, e.g., the section that is cut, and may not be useful in providing measurement information for remaining portions of the part that lay outside of the sectioned surface. Thus, unless the part being measured is already known to have a constant layer, region or phase thickness, the use of such destructive test method to gather measurements along one sectioned portion of the part may not be useful to provide an indication of the average.

Figure 3:
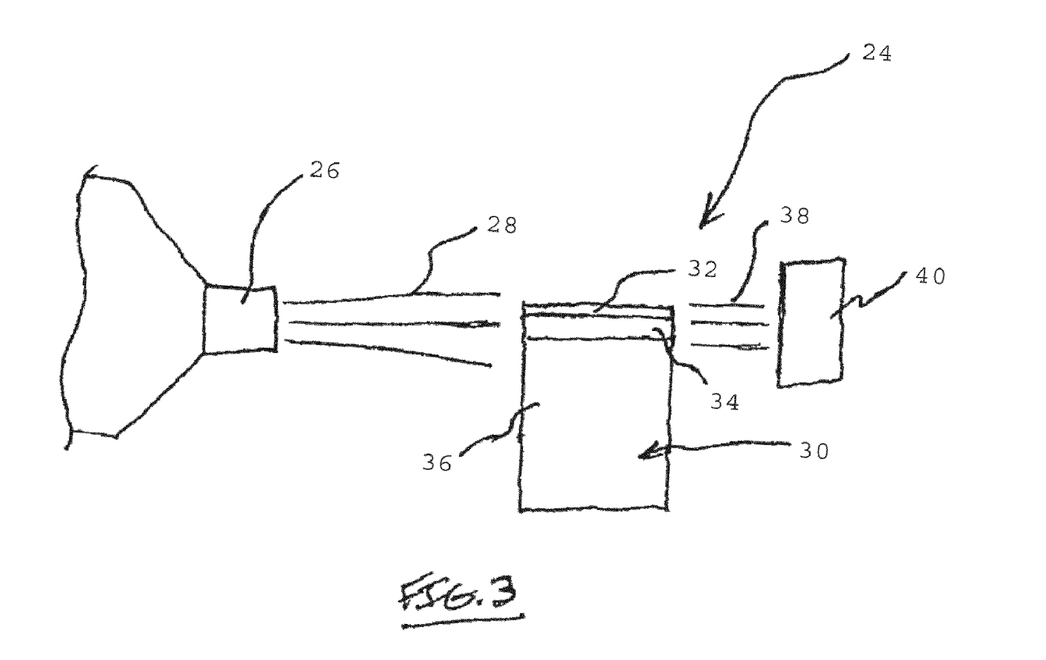
FIG. 3 is a schematic side view of an X-ray radioscopy device useful for determining a desired characteristic of one or more regions, layers, and/or phases within the ultra-hard polycrystalline construction of FIGS. 1 and 2.

XRR is a nondestructive measurement method or technique useful for measuring a desired characteristic, e.g., thickness, of one or more regions, layers, and/or phases within an ultra-hard polycrystalline construction. Referring to FIG. 3, XRR uses a device 24 that includes a radiation source 26 that is constructed to emit and direct X-ray wavelength electromagnetic radiation 28 onto a designated target. For use according to principles of this invention, the radiation source 26 is positioned generally perpendicular to an ultra-hard polycrystalline construction 30. In an example embodiment, the X-ray source 26 is positioned to direct X-ray radiation 28 in a direction perpendicular to or aligned with a target region of the ultra-hard polycrystalline construction 30, and specifically perpendicular to the first region 32.

The X-rays pass through the construction 30, the different regions, layers, and/or phases of the construction. In an example embodiment, the construction first region 32, second region 34, and the substrate 36, absorb different amounts of the X-ray radiation, thus allow respectively different amounts of the X-ray radiation to pass therethrough. The X-ray radiation 38 exiting the construction 30 is passed to a detecting source 40. In an example embodiment, the detecting source 40 can be provided in the form of photographic film, semiconductor plates, image intensifiers, or electronic hardware capable of creating, displaying and/or storing an electronic image of the X-rayed construction. Thus, the XRR device 24 is configured to produce a visual image of the construction showing its different layers, regions, and/or phases.

Figure 4:
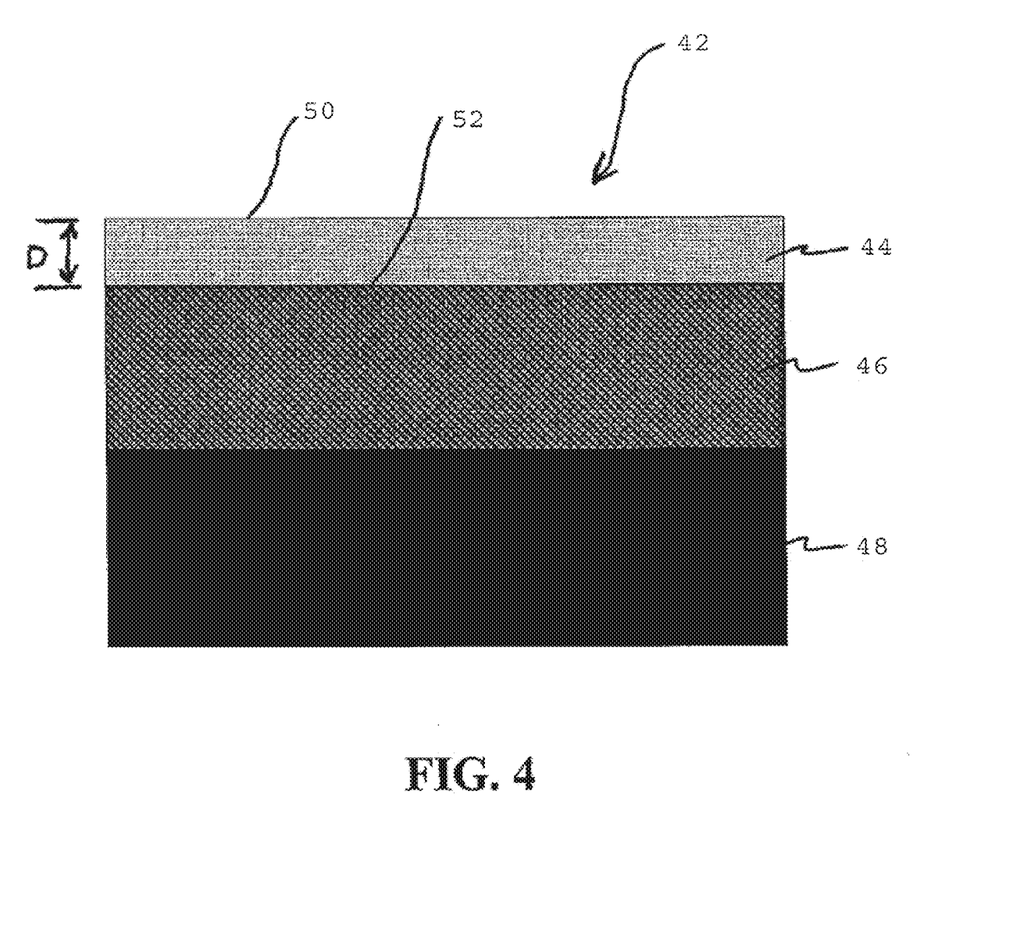
FIG. 4 is an X-ray image taken of an ultra-hard polycrystalline construction using the X-ray radioscopy device of FIG. 3.

FIG. 4 illustrates an image 42 provided by an XRR device as used to nondestructively measure the thickness of the construction first region 32. In an example embodiment, the image is one that is generated electronically from the X-ray radiation received from the construction and displayed on a suitable electronic display monitor. The image 42 provides an area plot of the construction volume, or in essence a shadow of the construction and its variation in density within the different construction regions.

In an example embodiment, the image 42 provided by the XRR device comprises a first image section 44 that corresponds to the construction first region 90, that is the lightest and that has the highest degree of exposure due to the absence of the catalyst material. The image 42 comprises a second image section 46 that corresponds to the construction second region 34, that is relatively darker and that has a lower degree of exposure than the first region due to the presence of the catalyst material. The image 42 comprises a third image section 48 that corresponds to the construction substrate 36, that is relatively darker and that has a lower degree of exposure than the second region 34 due to the heavy metal content in the substrate, e.g., when using a WC—Co substrate.

Because the X-ray radiation generated by the XRR device 24 is directed radially through the entire diameter of the target construction, the different sections presented in the image 42 represent an average thickness of each of the respective regions within the construction. Once the XRR device is properly calibrated, e.g., using a standard construction having regions of known thicknesses, one is able to measure from the image the bulk thickness of each construction region. As used herein, the term "bulk thickness" is understood to mean the average thickness of the particular region for the part. Thus, a feature of using the XRR device 24 for nondestructively measuring the construction is that, unlike the destructive test method that only provides region thickness information along a diametric section of the construction, it provides a projected area image of the construction and its different regions.

Another method that can be used to increase the precision of XRR is by narrowing the X-ray beam using a collimator or the like to produce a generally line-shaped beam as opposed to a pyramid or conical shaped beam. When the XRR device is configured in this manner, the line-shaped beam is generally aligned with a top surface of the object being measured and the object is mounted on a precision translation table. The part is then translated through the line-shaped beam and the translation distance is recorded when the boundary of the target region is detected. The geometrical error of this method to measure the target region thickness is greatly reduced compared to the accuracy of a standard beam approach. The table is used to move the object vertically through the source beam, thus projecting a series of line plots to create an area plot of the targeted region. This system can be programmed to capture a transition zone within the object, e.g., between two adjacent regions, layers and/or phases within the object, and provide an output from a translation axis that can be correlated to the depth of the targeted region being measured.

If desired, to increase the statistical confidence that the image produced by the XRR device captures the average thickness of each construction region, the XRR device can be used multiple times with the construction being rotated, e.g., three images of the construction could be taken with the construction being rotated 120 degree for each image. Also, to increase statistical confidence, one can apply a computer tomography (CT) method to create a 3-D image of the construction. As illustrated in FIG. 4, the average thickness of the construction first region 44 can be determined from the image by measuring the distance "D" from the surface 50 of the first image section 44 to the interface 52 with the second region 46.

This measurement can be performed manually by the user or can be done automatically, e.g., through the use of a computer software program such as one designed to calculate an average value from the electronic data representing an image section. For automation efficiency, multiple parts can be aligned on a reference surface or a robotic arm can load parts into the test fixture. In both cases, the use of a precision reference surface block is beneficial to reduce the alignment process. In an example embodiment, the average value for a desired construction region thickness is determined automatically, e.g., through the use of such computer software. If desired, the computer software can be configured to receive a user input, e.g., a target region thickness or the like, and provide a user output that compares the average measured thickness to the target thickness for the purpose of evaluating whether the construction conforms with the target thickness.

In an example embodiment, XRR is used as a nondestructive method for measuring the thickness of one or more desired regions, layers and/or phases within an ultra-hard polycrystalline construction that is part of a family of constructions or parts that have been made using the same materials and by using the same process of manufacture. The exact number of parts within a family can vary on a number of factors such as the types of materials used to form the construction, the number of total needed parts needed for the end-use application, and the process that is used to form the parts.

The XRR device is used to obtain measurement information regarding the region of the construction of interest. In an example embodiment, XRR is used to obtain an average measurement of a target region thickness to provide measurement information along a substantial area of the construction. This measurement information can be used, e.g., for determining whether the construction region thickness displays any unwanted irregularities that may operate to impair operating performance of the construction.

A feature of using XRR is that it can provide desired measurement information for one or more of a number of parts, e.g., a family of parts, in a relatively quick amount of time, thereby allowing a user to obtain in region thickness measurements of many parts in a time efficient manner, making XRR a good nondestructive test method use in a production environment.

While the device and method for nondestructive testing disclosed herein has been described as being useful to measure the thickness of one or more regions within an ultra-hard polycrystalline material, and in a preferred embodiment to measure the thickness of a region that is substantially free of catalyst material, it is to be understood that the nondestructive device and method described herein can be used to measure the thickness of any region, layer and/or phase within such constructions. Such regions may or may not include a catalyst material. For example, the nondestructive methods described herein can be used to measure the thickness of one or more regions within the construction having the same general ingredients but different proportions of the ingredients. For example, when the ultra-hard polycrystalline construction is PCD, the nondestructive methods of this invention can be used to measure the thickness of one or more different PCD regions characterized by having different diamond volume contents.

Additionally, while the nondestructive method of this invention has been described in the context of being useful to measure a region thickness that extends a depth from a particular surface, e.g., a front side surface, of ultra-hard polycrystalline material, it is to be understood that the nondestructive methods of this invention can be used to measure region thicknesses that extend from other surfaces of the construction in addition to or apart from the construction front side surface. For example, nondestructive methods of this invention can be used to measure the region thickness extending from a beveled or chamfered surface of the construction that is oriented at an angle to the front side surface, and/or extending from a sidewall surface extending axially between the front side surface of the construction to the substrate.

Further, while the device and method of this invention has been described as being useful to measure a thickness, it is to be understood that the device and method of this invention can be used to measure characteristics of regions, layers, and/or phases of the ultra-hard polycrystalline material other than thickness.

In an example embodiment, the nondestructive device and method described herein can be used to nondestructively measure the depth or thickness of one or more regions of ultra-hard polycrystalline constructions that are configured for use in a number of different applications, such as tools for mining, cutting, machining and construction applications. Such ultra-hard polycrystalline constructions are particularly well suited for forming working, wear and/or cutting components in machine tools and drill and mining bits such as roller cone rock bits, percussion or hammer bits, diamond bits, and shear cutters.

Figures 5, 6:
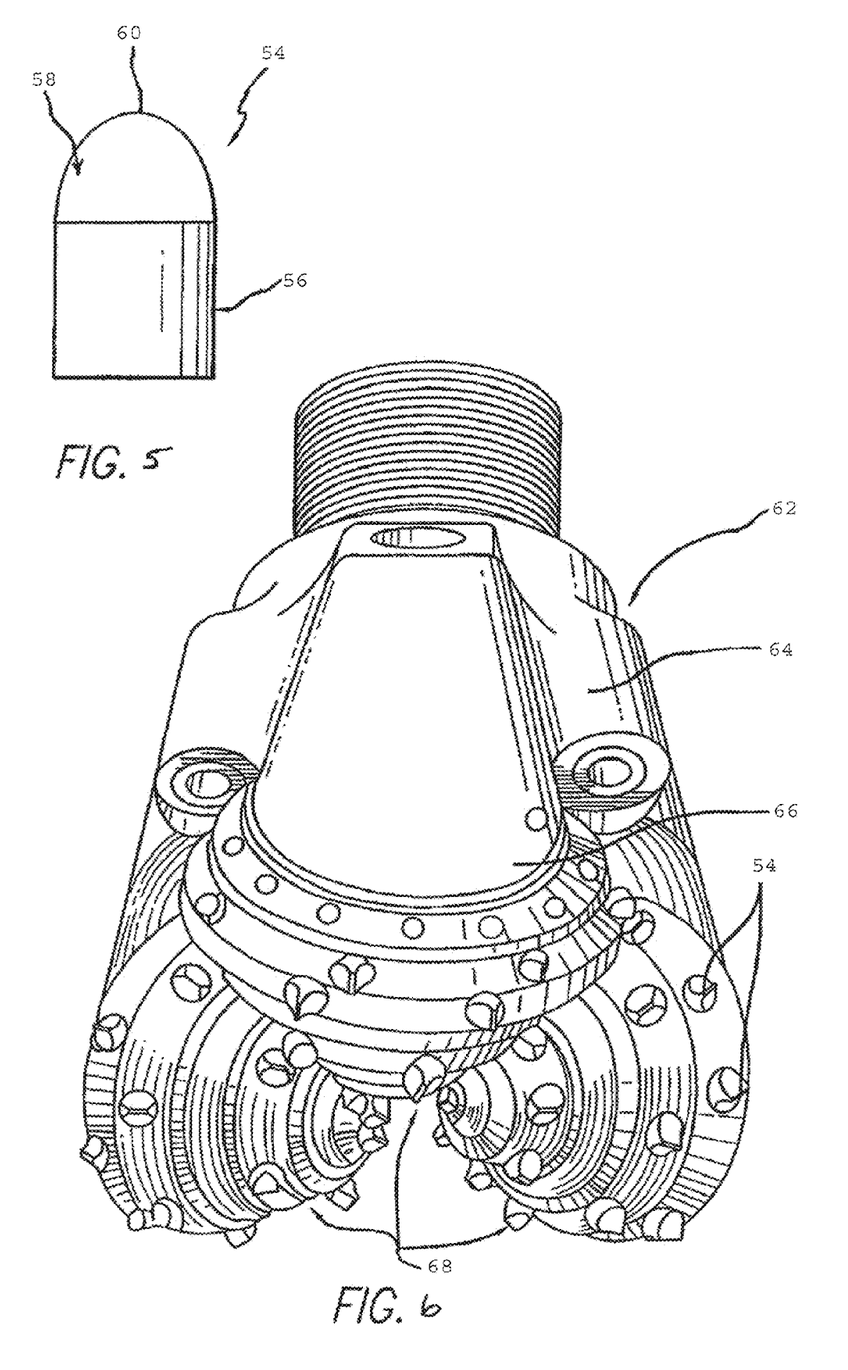
FIG. 5 is a perspective side view of an insert, for use in a roller cone or a hammer drill bit, comprising the ultra-hard polycrystalline construction measured using the nondestructive method of this invention.
FIG. 6 is a perspective side view of a roller cone drill bit comprising a number of the inserts of FIG. 5.

FIG. 5 illustrates an embodiment of an ultra-hard polycrystalline construction, comprising one or more regions within the body that can be measured using the nondestructive methods described above, provided in the form of an insert 54 used in a wear or cutting application in a roller cone drill bit or percussion or hammer drill bit. For example, such inserts 54 are constructed having a substrate portion 56, formed from one or more of the substrate materials disclosed above, that is attached to a body 58 having first and second regions as described above. In this particular embodiment, the insert comprises a domed working surface 60, and the first region is positioned along the working surface and extends a selected depth therefrom into the body. In an example embodiment, the insert can be pressed or machined into the desired shape or configuration prior to the treatment for removing the catalyst material from the first region. It is to be understood that ultra-hard polycrystalline constructions can be configured as inserts having geometries other than that specifically described above and illustrated in FIG. 5.

FIG. 6 illustrates a rotary or roller cone drill bit in the form of a rock bit 62 comprising a number of the wear or cutting inserts 54 disclosed above and illustrated in FIG. 5. The rock bit 62 comprises a body 64 having three legs 66 extending therefrom, and a roller cutter cone 68 mounted on a lower end of each leg. The inserts 54 are the same as those described above comprising the ultra-hard polycrystalline construction, and are provided in the surfaces of each cutter cone 68 for bearing on a rock formation being drilled.

Figure 7:
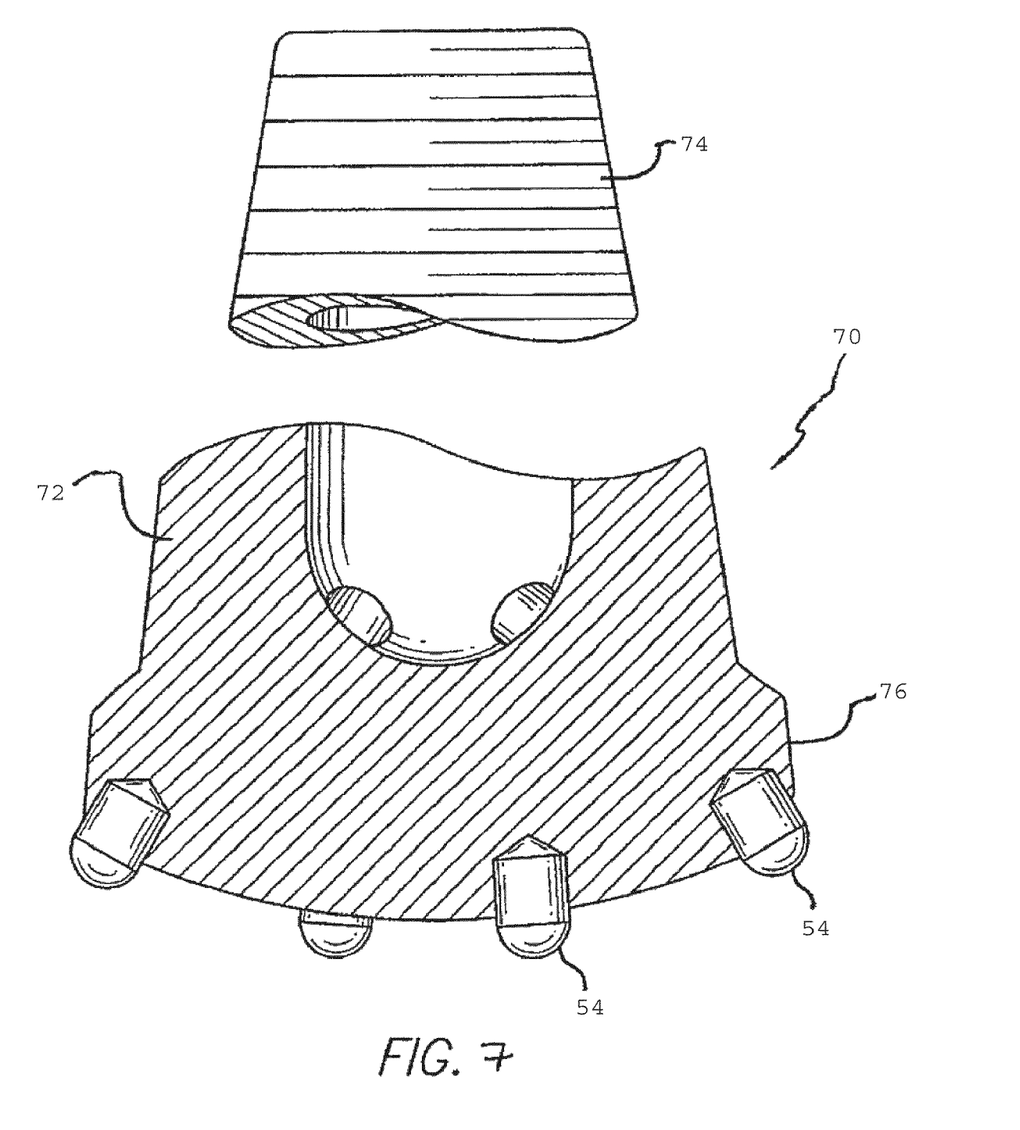
FIG. 7 is a perspective side view of a percussion or hammer bit comprising a number of inserts of FIG. 5.

FIG. 7 illustrates the insert 54 described above and illustrated in FIG. 5 as used with a percussion or hammer bit 70. The hammer bit generally comprises a hollow steel body 72 having a threaded pin 74 on an end of the body 72 for assembling the bit onto a drill string (not shown) for drilling oil wells and the like. A plurality of the inserts 54 is provided in the surface of a head 76 of the body 72 for bearing on the subterranean formation being drilled.

Figure 8:
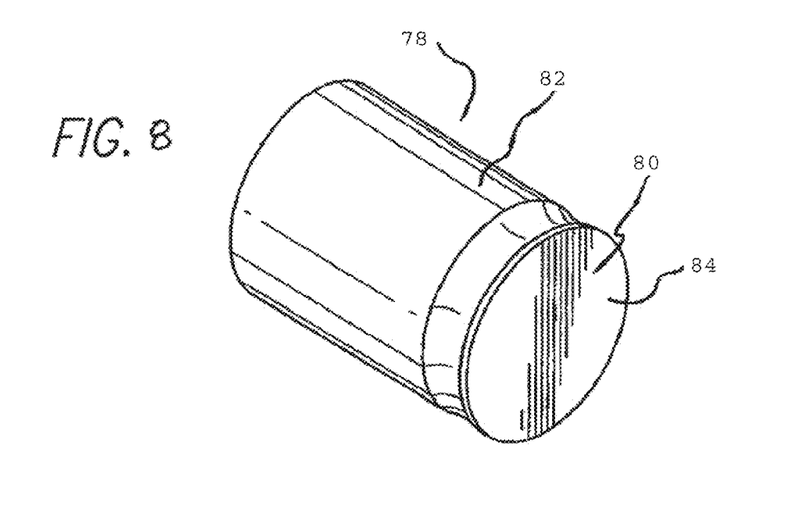
FIG. 8 is a schematic perspective side view of a shear cutter comprising the ultra-hard polycrystalline construction measured using the nondestructive method of this invention.

FIG. 8 illustrates an ultra-hard polycrystalline construction measured using the nondestructive methods described above as embodied in the form of a shear cutter 78 used, for example, with a drag bit for drilling subterranean formations. The shear cutter 78 comprises an ultra-hard polycrystalline body 80 that is sintered or otherwise attached to a substrate 82. The body 80 includes a working or cutting surface 84 that is formed from the construction first region. The working or cutting surface of the shear cutter can extend from the upper surface to a beveled surface defining a circumferential edge of the cutter and/or can extend along a sidewall surface of the cutter. The construction first region can extend a depth from such working surfaces. It is to be understood that ultra-hard polycrystalline constructions can be configured as shear cutters having geometries other than that specifically described above and illustrated in FIG. 8.

Figure 9:
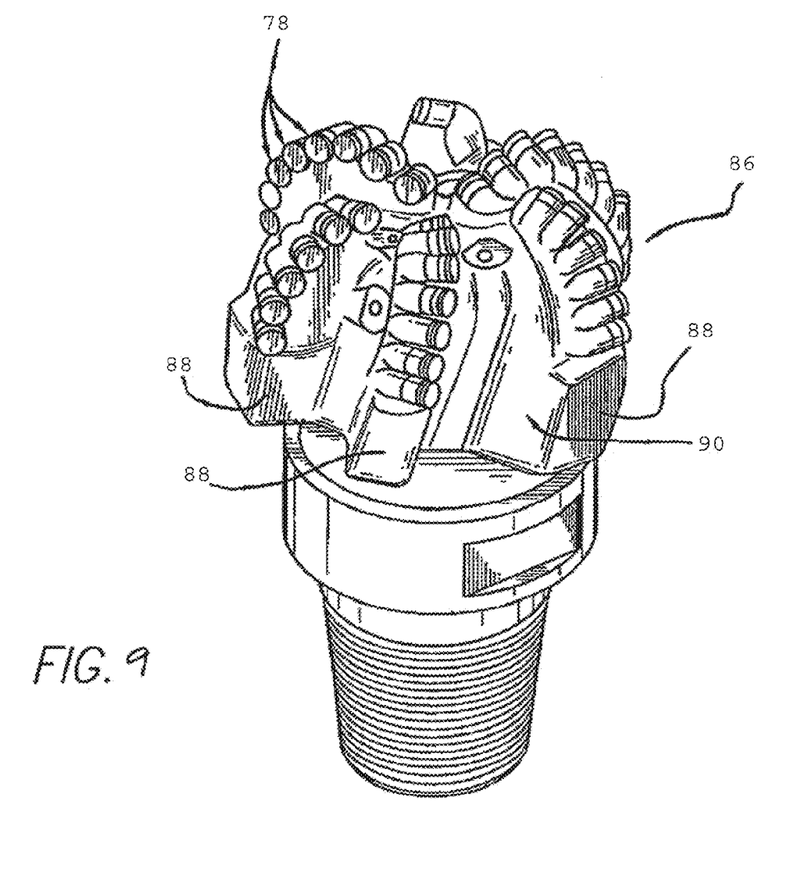
FIG. 9 is a perspective side view of a drag bit comprising a number of the shear cutters of FIG. 8.

FIG. 9 illustrates a drag bit 86 comprising a plurality of the shear cutters 78 described above and illustrated in FIG. 8. The shear cutters 78 are each attached to blades 88 that extend from a head 90 of the drag bit for cutting against the subterranean formation being drilled. Because the shear cutters of this invention include a metallic substrate, they are attached to the blades by conventional method, such as by brazing or welding.

Other modifications and variations of the nondestructive device and method of using the same to measure the thickness, depth or other characteristic of one or more regions, layers and/or phases within an ultra-hard polycrystalline construction will be apparent to those skilled in the art. It is, therefore, to be understood that within the scope of the appended claims, this invention may be practiced otherwise than as specifically described.

The invention claimed is:

1. A method for determining a characteristic within a sintered polycrystalline diamond body, the method comprising the steps of:
   projecting a beam of energy onto the sintered polycrystalline diamond body;
   receiving energy from the sintered polycrystalline diamond body; and
   determining the characteristic from the received energy.

2. The method as recited in claim 1 wherein the diamond body includes a top surface and a side surface, and wherein during the step of projecting, the beam of energy is projected onto the side surface of the diamond body.

3. The method as recited in claim 1 wherein the characteristic involves a region in the diamond body.

4. The method as recited in claim 3 wherein the region is substantially free of a catalyst material used to form the sintered polycrystalline diamond body.

5. The method as recited in claim 3 wherein the characteristic is a depth of the region.

6. The method as recited in claim 1 wherein the beam of energy is directed onto a surface of the body perpendicular to the beam.

7. The method as recited in claim 1 wherein the diamond body includes a substrate attached thereto to form a cutting element, and wherein the cutting element is attached to a bit used for drilling subterranean formations.

8. A method for determining a characteristic of a region within a sintered polycrystalline diamond body of an ultra-hard cutting element comprising a metallic substrate joined to the polycrystalline diamond body, the method comprising the steps of:
   projecting x-ray wavelength energy onto a surface of the sintered polycrystalline diamond body;
   receiving energy passing through the polycrystalline diamond body into a detecting source; and
   determining the characteristic by evaluating the energy received by the detecting source.

9. The method as recited in claim 8 wherein the polycrystalline diamond body comprises a matrix phase of bonded-together diamond grains and interstitial regions interposed between the diamond grains.

10. The method as recited in claim 9 wherein during the step of projecting, x-ray wavelength energy is directed to a region of the polycrystalline diamond body that includes interstitial regions that are substantially free of a catalyst material used to form the polycrystalline diamond body.

11. The method as recited in claim 10 wherein the characteristic being determined involves the region of the polycrystalline diamond body substantially free of the catalyst material.

12. The method as recited in claim 11 wherein the characteristic is a depth of the region substantially free of the catalyst material.

13. The method as recited in claim 8 wherein the cutting element is attached to a bit used to drill subterranean formations, and wherein the x-ray wavelength energy is directed onto a side surface of the polycrystalline diamond body.

14. A system for determining a characteristic of an ultra-hard polycrystalline construction comprising a sintered polycrystalline diamond body attached to a substrate, the system comprising:
   an emitter positioned to project a beam of energy onto a surface of the polycrystalline diamond body;
   a detector positioned adjacent the polycrystalline diamond body to receive energy passing therethrough; and
   means for determining the characteristic from the energy received by the detector.

15. The system as recited in claim 14 wherein the polycrystalline diamond body is interposed between the emitter and detector.

16. The system as recited in claim 14 wherein the emitter projects x-ray wavelength energy.

17. The system as recited in claim 14 wherein the polycrystalline diamond body includes a region that is substantially free of a catalyst material used to form the diamond body.

18. The system as recited in claim 17 wherein the characteristic being determined relates to the region substantially free of the catalyst material.

19. The system as recited in claim 18 wherein the characteristic is a depth of the region substantially free of the catalyst material.

20. The system as recited in claim 14 wherein the ultra-hard polycrystalline diamond construction is attached to a bit used for drilling subterranean formations.

* * * * *